United States Patent [19]
Jangi

[11] Patent Number: 5,606,550
[45] Date of Patent: Feb. 25, 1997

[54] ECHO CANCELLER AND METHOD FOR A VOICE NETWORK USING LOW RATE CODING AND DIGITAL SPEECH INTERPOLATION TRANSMISSION

[75] Inventor: Shrirang Jangi, Germantown, Md.

[73] Assignee: Hughes Electronics, Los Angeles, Calif.

[21] Appl. No.: 446,156

[22] Filed: May 22, 1995

[51] Int. Cl.$^6$ .................................... H04B 3/23
[52] U.S. Cl. .................. 370/289; 379/411; 370/290; 370/278
[58] Field of Search .................. 370/80, 81, 32, 370/32.1; 379/410, 411, 406

[56] References Cited

U.S. PATENT DOCUMENTS

| | | | |
|---|---|---|---|
| 4,852,161 | 7/1989 | Hagiwara | 379/410 |
| 4,918,727 | 4/1990 | Rohrs et al. | 379/410 |
| 4,998,241 | 3/1991 | Brox et al. | 379/411 |
| 5,274,705 | 12/1993 | Younce et al. | 379/410 |
| 5,428,604 | 6/1995 | Fuda | 370/32.1 |
| 5,434,916 | 7/1995 | Hasegawa | 379/410 |
| 5,463,618 | 10/1995 | Furukawa et al. | 370/32.1 |
| 5,475,731 | 12/1995 | Rasmusson | 379/410 |

*Primary Examiner*—Douglas W. Olms
*Assistant Examiner*—Chau T. Nguyen
*Attorney, Agent, or Firm*—Gordon R. Lindeen, III; Wanda K. Denson-Low

[57] ABSTRACT

An echo canceller for use in fixed-wireless telephony networks using low-rate packetized speech coding and DSI is disclosed. An adaptive filter is used to cancel an echo signal of a far-end signal introduced at the near-end by operating to provide a replica signal to cancel the echo signal. The replica signal is updated in the absence of a near-end talker signal presence of near talker signal is detected using an estimated echo-residual loss. The echo replica signal updating process is frozen upon the detection of double-talk. Residual echoes are suppressed without the use of non-linear processing. A residual suppression flag detection and a voice activated switching device are used to detect the absence of near-end signals. The switching device is opened if the signal to be transmitted is not a near-end signal or is noise.

29 Claims, 2 Drawing Sheets

ECHO CANCELLER AND METHOD FOR A VOICE NETWORK USING LOW RATE CODING AND DIGITAL SPEECH INTERPOLATION TRANSMISSION

BACKGROUND OF THE INVENTION

The present invention is directed to an echo canceller for improving the quality and network capacity of fixed-wireless networks using packetized low-rate coded voice and digital speech interpolation.

In a telephone network, four-wire and two-wire segments are joined at opposite ends of the network by hybrid circuits. However, unmatched impedance at the connection points between a two-wire segment and the four-wire segment causes a portion of an input signal on the receiving side to leak to the transmitting side via the hybrid circuit 3. The signal portion that leaks to the transmitting side is generally referred to as an echo.

Echoes are one of the primary factors affecting the perceived quality of voice connections. In telephony networks using low-rate packetized speech coding and digital speech interpolation, network delays are large, and therefore, echoes are easily perceptible, annoying and need to be suppressed. In addition, packet voice networks use digital speech interpolation (DSI) to improve the networks' traffic carrying capacity. In such networks, a transmission channel is allocated to a user only when its speech is active. Thus, DSI enables a larger number of users to share the network than the number of available transmission channels. The channel allocation is controlled by a voice activity detection (VAD) device which determines presence of voice on the channel. However, a VAD device does not distinguish between speech in the form of voice from a near-end speaker or speech in the form of an echo from a far-end speaker. Hence, the presence of echoes will trigger a VAD device to allocate transmission channels needlessly. Thus, the presence of echoes in DSI networks is undesirable not only because they are annoying, but also because echoes waste a network's traffic carrying capacity.

Network echo cancellers are conventionally used to eliminate the echoes caused by impedance mismatches in the echo path formed by hybrid circuits. Generally, such echo cancellers utilize an adaptive transversal filter that monitors an incoming speech signal from a far-end speaker and models a linear impulse response using a coefficient adaptation algorithm to replicate the parameters of the actual echo expected in the outgoing signal. The replicated signal is subtracted from the outgoing signal to cancel the actual undesired echo portion of the outgoing signal. The remaining signal is fed back to the adaptive filter and used to update the replicated signal. This feedback loop allows the adaptive filter to converge to a close approximation of the echo parameters. However, when both incoming (speech from a far-end speaker) and outgoing (speech from a near-end speaker) signals are present at the same time, the adaptive filter is no longer able to effectively cancel the undesired echo signals. This is because the echo signal is included with the near-end speech signal in the outgoing signal, which causes the remaining signal fed back to the adaptive filter to increase and disturb the updating process.

When both near-end and far-end speakers are talking, the condition is termed "doubletalk." Accordingly, it is current practice to provide a double-talk detector to detect double-talk and to terminate the updating process of the adaptive filter to prevent the echo cancellation from being undesirably lessened. A conventional double-talk detector assumes that the echo-return loss (ERL), defined as the ratio of the power of the reflected to the incident signal, is known (approximately ½ or 6 dB). Such a detector declares the presence of a double-talk condition when the reflected signal power is more than ½ of the incident power. However, the problem with this scheme is that the echo-residual loss (ERL) of a hybrid circuit 3 can vary widely from as little as 3 dB to as much as 25 dB, or more depending on the telephone set or number of sets used in tandem.

Ideally, an echo cancellor, which has perfectly converged should be able to remove all of the echo from the incoming or incident signal. However, conventional practical echo cancellers are typically able to remove 36–40 dB of the echo signal. Although 36–40 dB of attenuation is substantial, it is not enough to remove all of the perception of the echo thereby. As a result, a residual echo remains in the outgoing signal. This limitation of practical echo cancellers may be due to their inability to model the non-linear distortions in the echo path or the fact that a speech signal has periodicities, and adaptive algorithms, such as a least-mean square (LMS) algorithm used in echo cancellers, have poor performance for signals with periodicities. As a result of the limitations of the echo estimation process, a non-linear processor is conventionally employed to further remove residual echoes. Conventional non-linear processors have a center-clipper transfer function in which digital samples of speech lower than a certain value are squelched to zero.

However, in telephony networks using low-rate packetized speech coding and digital speech interpolation, a center-clipper non-linear processor is not desirable because low-rate compression algorithms are sensitive to any non-linearity in the outgoing signal. The non-linear processing causes an on-off effect, which is undesirable for processing by low-bit rate speech encoders, since this causes a degradation in the quality of the encoded speech.

A discussion of echo cancellers using adaptive filtering techniques can be found in "Digital Voice Echo Canceller with TMS32020," D. Messerschmidt et al. in Digital Signal Processing Applications with the TMS320 Family, Theory, Algorithms and Implementations, Vol. 1, 1989.

It would be advantageous to provide an echo canceller that terminates its adaptive updating process in a double-talk condition wherein a double-talk condition is detected by accurately estimating the echo-residual loss (ERL), rather than assuming a value of the echo-residual loss (ERL). Also, it would be advantageous to avoid the use of a center-clipper non-linear processor to remove residual echo signals.

SUMMARY OF THE INVENTION

The present invention is a novel and improved network echo canceller for fixed-wireless telephony applications. In accordance with the present invention, an echo canceller is employed wherein the impulse response of the unknown echo channel is identified, a replica of this echo is generated using adaptive filtering techniques, and the echo replica is subtracted from the signal heading toward the far-end talker to cancel the near-end talker echo. The echo suppression used in the present invention does not use non-linear suppression.

According to the invention, it is an object of the present invention to accurately estimate the echo-residual loss rather than assume a echo-residual-loss factor for use in freezing the updating process of an adaptive filter.

It is a further object of the present invention to prevent the transmission of a residual echo in the absence of near-end speech signals without non-linear processing.

According to the invention, an echo canceller is disclosed for permitting the transmission of near-end speech, comprising:

a subtracting device for cancelling an echo signal, said subtracting device having a pair of inputs and an output, with an input of said subtracting device for receiving a speech signal and the other input of said subtracting device for receiving an echo replica signal;

an adaptive filter for adaptively providing and updating a replica echo signal, said adaptive filter having a pair of inputs and an output, with an input of said adaptive filter for receiving a far-end speech signal, the other input coupled to the output of said subtracting device, and the output of said adaptive filter for providing a replica echo signal to said other input of said subtracting device; and an echo-return loss estimator for estimating an echo-return loss across said an input of said subtracting device and said an input of said adaptive filter for receiving a far-end speech signal and detecting a double-talk condition, said echo-return loss estimator having a pair of inputs, with one input for receiving a far-end speech signal and the another input for receiving a speech signal appearing at said an input of said subtracting device;

wherein, said echo-return loss estimator acts to freeze the replica echo updating function of said adaptive filter upon detecting a double-talk condition.

Also, a residual echo suppressor is disclosed for preventing the transmission of residual echo signals, comprising:

a subtracting device for cancelling an echo signal, said subtracting device having a pair of inputs and an output, with an input of said subtracting device for receiving a speech signal and the other input of said subtracting device for receiving an echo replica signal;

an adaptive filter for adaptively providing and updating a replica echo signal, said adaptive filter having a pair of inputs and an output, with an input of said adaptive filter for receiving a far-end speech signal, the other input coupled to the output of said subtracting device, and the output of said adaptive filter for providing a replica echo signal to said other input of said subtracting device;

a residual suppression flag detector for detecting the absence of near-end signals, said residual suppression flag detector having an input for receiving said a speech signal received by said subtracting device, another input for receiving the signal outputted from said output of said subtracting device, and an output for providing a flag signal indicating the absence of a near-end signal; and a switching device coupled to said output of said subtracting device, said switching device being responsive to said flag signal for preventing the transmission of signals outputted from said output of said subtracting device in the presence of a flag signal.

In addition, according to the present invention, there is disclosed a method for transmitting near-end speech in a fixed-wireless network, comprising the steps of:

receiving at a near-end a far-end speech signal when a far-end speaker is talking;

generating a near-end speech signal when a near-end speaker is talking;

providing an echo replica signal of said far-end speech signal;

subtracting said near-end signal and said echo replica signal from an echo signal reflected from said far-end signal due to echo-residual loss at the near-end;

updating the value of said echo replica signal to minimize any residual echo signal remaining after subtracting said echo replica signal from said echo signal;

estimating said echo-residual loss by detecting the power level of the far-end speech signal and the power level of said echo signal;

detecting a double-talk condition when the power level of said far-end speech signal is greater than the power level of said echo signal and said near-end signal minus the value of the estimated echo-return loss; and freezing the value of said echo replica signal when a double-talk condition is detected.

Also the present invention discloses a method of transmitting near-end speech in a fixed- wireless network, comprising the steps of:

receiving at a near-end a far-end speech signal when a far-end speaker is talking;

generating a near-end speech signal when a near-end speaker is talking;

providing an echo replica signal of said far-end speech signal;

subtracting said echo replica signal from an echo signal reflected from said far-end speech due to echo-residual loss at the near-end;

updating the value of said echo replica signal to minimize any residual echo signal remaining after subtracting said echo replica signal from said echo signal;

detecting the absence of near-end speech signals; and preventing the transmission of any speech signal in the absence of a near-end speech signal.

As pointed out in greater detail below, the echo canceller of this invention provides the following advantages. The use of the echo-residual-loss estimator according to the invention enables a more accurate estimation of the echo-residual loss (rather than assuming a value of echo-residual loss (ERL)) for freezing the updating process of a conventional adaptive filter. As a result, an adaptive filter can more accurately provide the replica echo signal used to cancel the undesired echo signal.

In addition, the echo canceller of the present invention does not rely on conventional non-linear processing to suppress residual echo signals. The use of a residual flag suppression detector according to this invention avoids non-linear suppression for suppressing residual echoes, yet prevents wasting fixed-wireless network's capacity due to the transmission of undesirable residual echo signals.

The invention itself, together with further objects and attendant advantages, will best be understood by reference to the following detailed description taken in conjunction with the accompanying drawings.

DESCRIPTION OF THE PREFERRED EMBODIMENT

Figure 1:
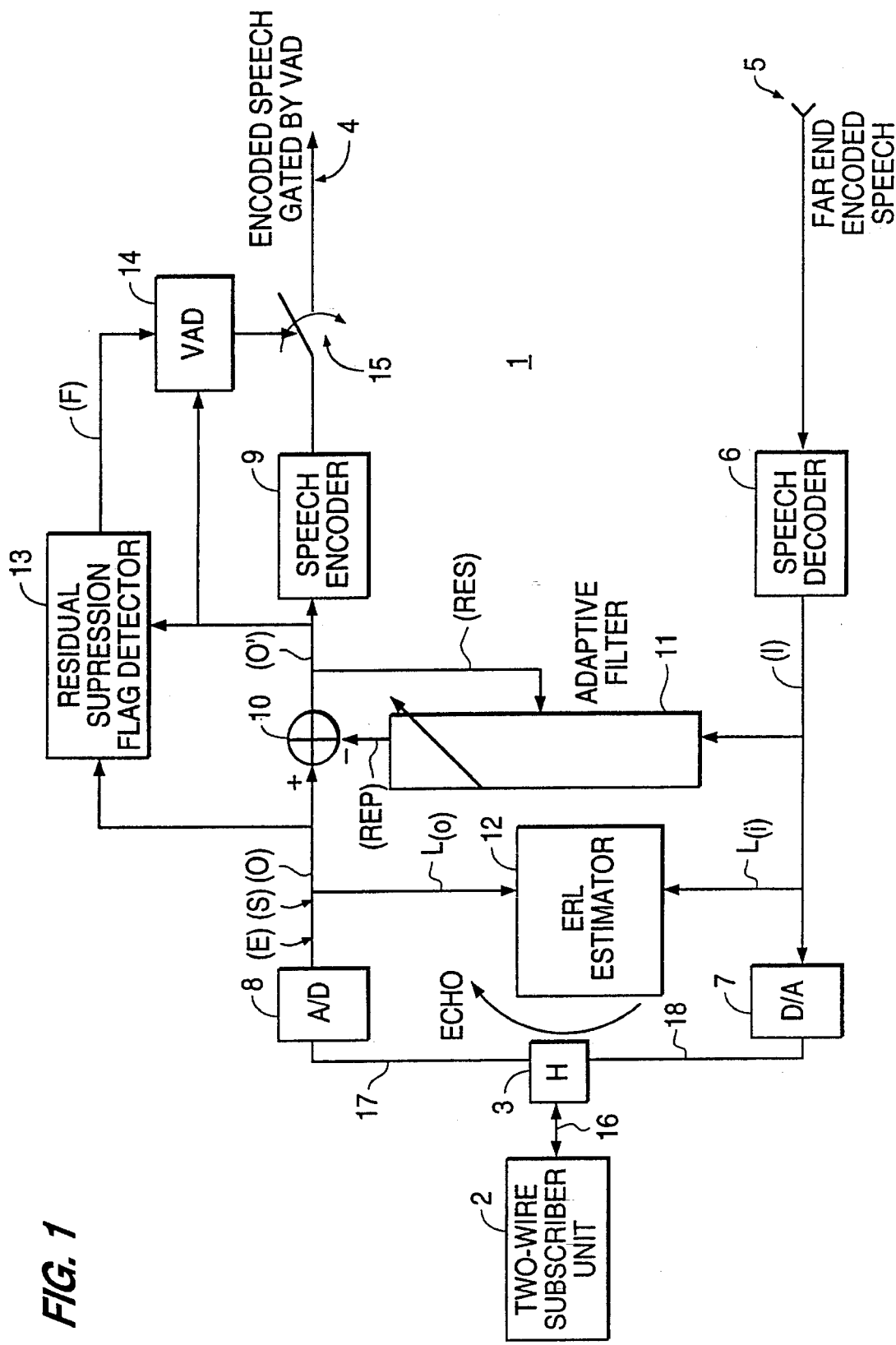
FIG. 1 is a simplified block diagram of the preferred embodiment of the present invention.

The principle of the echo canceller of the present invention for one direction of transmission is illustrated by the block diagram illustrated in FIG. 1. The block diagram of FIG. 1 shows one end of a fixed-wireless network 1, which allows a two-wire subscriber unit 2 for a near-end speaker to transmit echo-free packetized low-rate coded speech signals.

The two-wire subscriber unit 2 represents a conventional two-wire telecommunications device. Network 1 is substantially a near-end of a four-wire network. Thus, a two-wire side of a two-wire to four-wire hybrid circuit 3 couples the two-wire subscriber unit 2 to the near-end of the four-wire network 1. The hybrid circuit 3 is a conventional hybrid circuit, which converts between two-wire and four-wire communications circuits. However, due to impedance mismatches, the hybrid circuit 3 forms an echo path and generates or reflects an undesired echo signal (E) of the incoming or incident signal (I).

The four-wire network 1 includes a transmission path formed between a four-wire side of hybrid circuit 3 and output antenna 4, and a reception path formed between another four-wire side of hybrid circuit 3 and input antenna 5. The reception path includes a speech decoder 6 and a digital to analog (D/A) converter 7. The transmission path includes an analog to digital (A/D) converter 8 and a speech encoder 9. An echo canceller unit including a subtracting device or summing device 10 and an adaptive transversal filter 11 is included in the network 1 in the manner shown in FIG. 1.

In addition, the block diagram of FIG. 1 shows an echo-return loss (ERL) estimator 12 connected across the four-wire network 1. The ERL estimator 12 has a pair of inputs, one input connected to the output of the A/D convertor 8 and another input connected to the input of the D/A converter 7.

A residual suppression flag (RSF) detector 13 is connected across the subtracting device 10.

A voice activated detection (VAD) processor 14 having a pair of inputs and an output is also shown in FIG. 1. One input of the VAD processor 14 is connected to the output of the subtracting device 10. Another input of the VAD processor 14 is connected to the output of the RSF detector 13. The output of the VAD processor 14 is connected to control a switching or gating device 15. The switch device 15 is connected to the output of the speech encoder 9.

In the operation of the echo canceller described above, signals issuing from the subscriber unit 2, or near-end speaker, are first transmitted, at least over a short distance, in their analog form through a bi-directional two-wire line 16. The two-wire line is then split into two mono-directional lines 17 and 18. This split is achieved through the hybrid circuit 3. The upper mono-directional line 17 is for outgoing signals; the lower mono-directional line 18 is for incoming signals. An incoming signal is received by the input antenna 5 from a far-end speaker and decompressed by the speech decoder 6 to form a digital pulse-code modulated (PCM) speech signal (I). The digital signal is converted to an analog signal in the D/A converter 7, and passed through the hybrid circuit 3 to the subscriber unit 2. The outgoing signal (O) on the upper mono-directional line 17 coming out of the hybrid circuit 3 comprises an analog speech signal (S) from the subscriber unit 2, when the near end speaker is talking, and an echo signal (E) when the far-end speaker is talking, which signals are converted to digital form by the A/D converter 8. The echo signal (E) is generated due to the impedance mismatching in the echo path between points 16 and 18 when the far-end speaker is talking. If unimpeded, the echo signal will be encoded by the speech encoder 9 and transmitted over a channel, thereby wasting the network's capacity.

In the absence of a signal (S) from the subscriber unit 2, but in the presence of an incoming signal (I), the adaptive filter 11 and subtracting device 10 operate in the manner described by Messerschmidt et al. to remove the echo signal (E) from the upper mono-directional line 17 by subtracting an echo replica signal (REP) of the echo signal (E) from the outgoing signal (O). The echo replica signal (REP) is subtracted from the echo signal (E) in outgoing signal (O) in the subtracting unit 10 to yield, in most instances, a residual echo signal (RES). Ideally the residual echo signal (RES) is very small after the subtraction or cancellation of the echo signal (E) in the subtracting device 10.

The echo replica signal (REP) is generated in the manner described by Messerschmidt et al. In particular, an incoming signal (I) is applied to an input of the conventional adaptive filter 11 and to the hybrid circuit 3. The incoming signal (I) is processed by the adaptive filter 11 to produce the replica echo signal (REP). The subtracting device 10 receives an echo signal (E) and the replica echo signal (REP) from the adaptive filter 11. The subtracting device 10 subtracts out the echo signal (E). Another input of the adaptive filter 11 receives the residual echo signal (RES) outputted from the subtracting device 10. The adaptation algorithm of the adaptive filter infers from the residual echo signal (RES) the appropriate correction to the transversal filter coefficients and attempts to make the residual echo signal (RES) as close to the undesired echo signal (E) as possible.

However, if a near-end speaker is talking at the same time an incoming signal (I) is being received, the subscriber unit's signal (S) is added to the echo signal (E) thereby, resulting in a double-talk condition. As a result, the residual echo signal (RES) undesirably increases and accordingly disturbs the adaptation algorithm. Effective echo cancellation is no longer possible. In order to overcome such a problem, an echo-residual loss (ERL) estimator 12, according to the present invention, is provided to ascertain or detect a double-talk condition and freeze the adaptation process of the adaptive filter 11.

Figure 2:
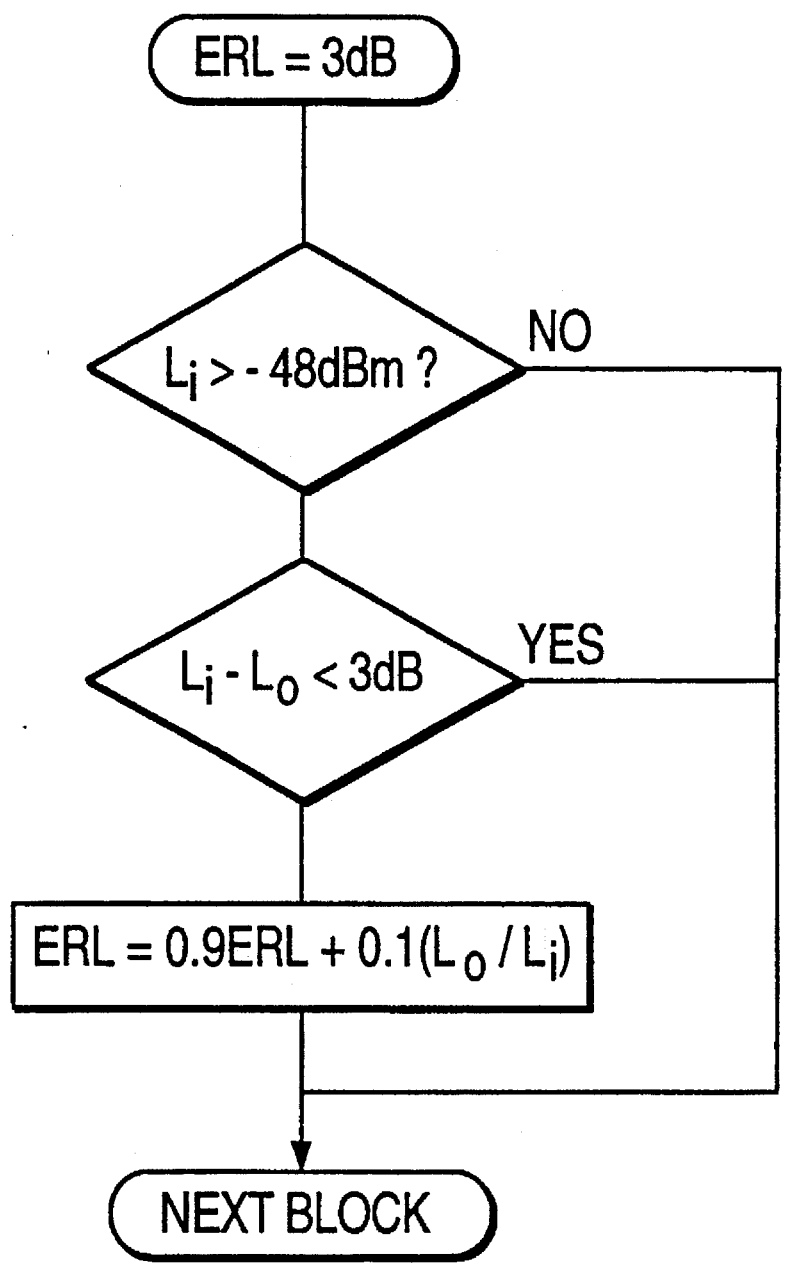
FIG. 2 is a diagram of the process of the preferred embodiment of the present invention for estimating echo-residual-loss of an echo path.

The instant invention involves a novel process for accurately estimating the echo-residual loss (ERL) of the near-end echo path and using the value of the echo-residual loss (ERL) to freeze the adaptation process of the adaptive filter 11. Specifically, the echo-residual loss (ERL) is accurately estimated with the algorithm set out in FIG. 2. The algorithm is processed as follows. Initially, the echo-residual loss (ERL) is estimated to be 3 dB, which is a good starting point for practical hybrid circuits. The ERL estimator 12 receives the instantaneous signal power for the incoming signal (I) denoted by $L_i$ and the outgoing signal (O) denoted by $L_o$ every 6.6 ms. Initially, an instantaneous estimate of the echo-residual loss (ERL) is computed by ($L_o/L_i$). Next, the initial computation of the echo-residual loss (ERL) is updated by using the formula 0.9 ERL+0.1 ($L_o/L_i$) until an accurate estimation of (ERL) is achieved.

Next, the estimated value of the echo-residual loss (ERL) is used to detect a double-talk condition. The detection is based on the fact that the outgoing signal (O) being fed to the subtracting unit 10 comprises a near-end speaker's speech signal (S), if the near-end speaker is talking, and an echo signal (E), when a speech signal (I) is received from the far-end speaker. Specifically, the outgoing signal (O) equals near-end speech (S) and an echo signal (E), i.e., O=S+E. However, the echo signal (E) is equal to the incoming signal (I) minus the echo-residual loss (ERL), i.e., (E)=(I)–(ERL).

Now if the echo-residual loss (ERL) is known, the condition (O)>(I)–(ERL) will accurately detect the presence of double-talk. For example, if the echo-residual loss (ERL) is estimated to be 12 dB, and the power of incoming speech signal is 20 dB, then (E) is 8 dB. In the absence of a near-end speaker signal (S), the outgoing signal (O) will be 8 dB. However, if the near-end speaker is also talking and the power of the near-end speech is 10 dB, the outgoing signal (O) will be 18 dB, which is greater than 8 dB, i.e., (I)–(ERL) or (E). Thus, a double-talk condition is detected and the ERL estimator 12 acts to freeze the adaptation process of the adaptive filter 11 and permits the signal (O') being outputted by the subtracting device 10 to include the echo signal (E).

Further, with respect to the ERL estimator 12, the updating of the echo-residual loss (ERL) is skipped whenever $L_i < -48$ dB since under this condition, the signal is too small and may result in a high computational error. Further, the updating is skipped also if ($L_i - L_o < 3$ dB), as this condition is an indication of a probable double-talk and thus, will result in a wrong instantaneous echo-residual loss (ERL) value ($L_o/L_i$). The computation of the echo-residual loss (ERL) as described in this application is an important part of this invention.

Another advantageous aspect of this invention centers around the treatment of the residual echo signal (RES). As described above, the signal outputted from the subtracting device 10 may still contain some residual echo signal. The present invention also provides a novel approach for preventing the residual echo signal (RES), in the absence of a near-end speech signal (S), from wasting a transmission channel. This novel approach does not use non-linear processing in which digital samples of speech lower than a certain value are squelched to zero. In particular, the present invention uses the RSF detector 13 in combination with the VAD processor 14 to control the switch 15. The switch 15 is opened if the outgoing signal (O') flowing from the subtracting device 10 includes only a residual echo signal (RES), in the absence of a near-end speech signal (S). In addition, the VAD processor 14 is used to open the switch 15 if the outgoing signal (O') comprises background noise or silence. Conversely, the switch 15 is closed to transmit encoded speech packets only when the subscriber unit 2 is transmitting speech signals from the near-end speaker.

In the operation of the RSF detector 13, the VAD processor 14 and the switch 15, the RSF detector 13 compares the power levels of the signals on either side of the subtracting device 10. The RSF detector 13 operates continuously for each frame of speech to be compressed into a speech packet. Accordingly, the outgoing signal (O), inputted to the subtracting unit 10 may comprise a near-end speech signal (S) from the subscriber unit 2 and an echo signal (E), or either a near-end speech signal (S) or an echo signal (E). The signal (O') outputted from the subtracting unit 10 may comprise a near-end signal (S) from the subscriber unit 2 and an echo-residual signal (RES), or either a near-end speech signal (S) or a residual echo signal (RES). If the signal (O) being input to the subtracting device 10 minus the signal (O') being outputted from the subtracting device is greater than 6 dB, i.e., (O)–(O')>6 dB, a flag (F) is set by the RSF detector 13 indicating that at least 6 dB of attenuation has taken place and that, hence, the signal (O') does not include a near-end speech signal (S) from the subscriber unit 2. The flag (F) is then fed to the VAD processor 14, which opens the switch 15 and prevents the residual echo signal (RES) from wasting a transmission channel.

The VAD processor 14 can be any general device that discriminates between background noise (or silence) and active telephony speech signal. Specifically, the VAD processor 14 acts on signal (O') leaving the subtracting device 12, and closes the switch 15 whenever active telephony speech is detected in (O'), and opens the switch 15 when the signal leaving the subtracting device 12 (O') is deemed to contain background noise or silence.

In addition to opening the switch 15 in response to a flag signal (F) indicating that a near-end speech is absent in the signal (O') leaving the subtracting device 12, the VAD processor 14 also sets the switch 15 open when the signal (O') is noise. Thus, even if a residual echo signal (RES) in the signal (O') leaving the subtracting device 12 may trigger the VAD 14 to close the switch 15, the flag (F) will be set whenever enough echo enhancement (6 dB) is perceived by the RSF detector 13, and will prevent the VAD processor 14 from closing the switch 15.

The preferred embodiment described above provides a number of significant advantages. The combination of the RSF detector 13 and the VAD processor 14 avoid non-linear processing techniques to suppress residual echoes or speech signals about to be encoded. This combination of detection and processing achieves the benefit of suppressing residual echoes on encoded and packetized speech without the introduction of non-linearity into the speech material. In essence, the network capacity is not wasted by transmitting undesirable echoes. In addition, the novel ERL estimator 12 accurately estimates the echo path loss and detects a double-talk condition to freeze the adaptation process of the adaptive filter 11. The novel ERL estimator 12 is particularly advantageous because it can update the value of the echo-residual loss (ERL) each time the impedance mismatch of the echo path changes depending, for example, on the type of subscriber unit used or on the number of subscriber units that are used in tandem at the near-end.

Of course, it should be understood that a wide range of changes and modifications can be made to the preferred embodiment described above. It is therefore intended that the foregoing detailed description be understood that it is the following claims, including all equivalents, which are intended to define the scope of this invention.

What is claimed is:

1. An echo canceller for permitting the transmission of near-end speech, comprising:

a subtracting device for cancelling an echo signal, said subtracting device having a pair of inputs and an output, with an input of said subtracting device for receiving a speech signal and the other input of said subtracting device for receiving an echo replica signal;

an adaptive filter for adaptively providing and updating a replica echo signal, said adaptive filter having a pair of inputs and an output, with an input of said adaptive filter for receiving a far-end speech signal, the other input coupled to the output of said subtracting device, and the output of said adaptive filter for providing a replica echo signal to said other input of said subtracting device; and an echo-return loss estimator for estimating an echo-return loss across said an input of said subtracting device and said an input of said adaptive filter for receiving said far-end speech signal and detecting a double-talk condition, said echo-return loss estimator having a pair of inputs, with one input for receiving said far-end speech signal and the another input for receiving a speech signal appearing at said an input of said subtracting device, wherein said echo-return loss estimator calculates the echo-return loss based on a ratio of an instantaneous signal power for the far-end speech signal ($L_i$) and an instantaneous signal power for a sum of a near-end speech signal and an echo signal ($L_o$);

wherein said echo-return loss estimator updates the echo-return loss (ERL) in accordance with the relation:

$ERL=0.9*ERL+0.1*(L_o/L_i)$; and wherein, said echo-return loss estimator acts to freeze the replica echo updating function of said adaptive filter upon detecting a double-talk condition.

2. The echo canceller of claim 1, wherein said echo-return loss estimator detects said double-talk condition when the power level of the signal received at said another input of said echo-return loss estimator is greater than the power level of the signal received at said one input of said echo-return loss estimator minus the value of the echo-return loss estimated by said echo-return loss estimator.

3. The echo canceller of claim 2, further including, a hybrid circuit having one end forming an output coupled to said an input of said subtracting device and another end forming an input coupled to said an input of said adaptive filter for receiving a far-end speech signal, said hybrid circuit for transmitting speech signals from a subscriber unit to said subtracting device and for transmitting far-end speech signals to said a subscriber unit.

4. A residual echo suppressor for preventing the transmission of residual echo signals, comprising:

a subtracting device for cancelling an echo signal, said subtracting device having a pair of inputs and an output, with an input of said subtracting device for receiving a speech signal and the other input of said subtracting device for receiving an echo replica signal;

an adaptive filter for adaptively providing and updating the replica echo signal, said adaptive filter having a pair of inputs and an output, with an input of said adaptive filter for receiving a far-end speech signal, the other input coupled to the output of said subtracting device, and the output of said adaptive filter for providing a replica echo signal to said other input of said subtracting device;

a residual suppression flag detector for detecting the absence of near-end signals, said residual suppression flag detector having an input for receiving said speech signal received by said subtracting device, another input for receiving the signal outputted from said output of said subtracting device, and an output for providing a flag signal indicating the absence of a near-end signal; and a switching device coupled to said output of said subtracting device, said switching device being responsive to said flag signal for preventing the transmission of signals outputted from said output of said subtracting device in the presence of a flag signal.

5. The residual echo suppressor of claim 4, wherein said residual suppression flag detector detects the absence of a near-end signal when the power level of the signal received at said an input of said residual suppression flag detector minus the power level of the signal received at said another input of said residual suppression flag detector is greater than 6 dB.

6. The residual echo suppressor of claim 4, further including, a voice activated detector for controlling said switching device, said voice activated detector receiving the signal outputted from said output of said subtracting device and the flag signal from said output of said residual suppression flag detector.

7. The residual echo suppressor of claim 6, further including, a hybrid circuit having one end forming an output coupled to said an input of said subtracting device and another end forming an input coupled to said an input of said adaptive filter for receiving a far-end speech signal, said hybrid circuit for transmitting speech signals from a subscriber unit to said subtracting device and for transmitting far-end speech signals to said a subscriber unit.

8. A fixed-wireless network for permitting the transmission of near-end speech and for preventing the transmission of residual echo signals, comprising:

a subtracting device for cancelling an echo signal, said subtracting device having a pair of inputs and an output, with an input of said subtracting device for receiving a speech signal and the other input of said subtracting device for receiving an echo replica signal;

an adaptive filter for adaptively providing and updating a replica echo signal, said adaptive filter having a pair of inputs and an output, with an input of said adaptive filter for receiving a far-end speech signal, the other input coupled to the output of said subtracting device, and the output of said adaptive filter for providing a replica echo signal to said other input of said subtracting device; and an echo-return loss estimator for estimating an echo-return loss across said an input of said subtracting device and said an input of said adaptive filter for receiving a far-end speech signal and detecting a double-talk condition, said echo-return loss estimator having a pair of inputs, with one input for receiving a far-end speech signal and the another input for receiving a speech signal appearing at said an input of said subtracting device;

a residual suppression flag detector for detecting the absence of near-end signals, said residual suppression flag detector having an input for receiving said a speech signal received by said subtracting device, another input for receiving the signal outputted from said output of said subtracting device, and an output for providing a flag signal indicating the absence of a near-end signal; and a switching device coupled to said output of said subtracting device, said switching device being responsive to said flag signal for preventing the transmission of signals outputted from said output of said subtracting device in the presence of a flag signal;

wherein, said echo-return loss estimator acts to freeze the replica echo updating function of said adaptive filter upon detecting a double-talk condition.

9. The fixed-wireless network of claim 8, wherein said echo-return loss estimator estimates said echo-return loss (ERL) in accordance with the relation:

$ERL=0.9*ERL+0.1*(L_o/L_i)$ wherein $L_o$ is an instantaneous signal power of a sum of the near-end speech signal and an echo signal, and wherein $L_i$ is an instantaneous signal power of the far-end speech signal.

10. The fixed-wireless network of claim 9, wherein said echo-return loss estimator detects said double-talk condition when the power level of the signal received at said another input of said echo-return loss estimator is greater than the power level of the signal received at said one input of said echo-return loss estimator minus the value of the echo-return loss estimated by said echo-return loss estimator.

11. The fixed-wireless network of claim 10, further including, a hybrid circuit having one end forming an output coupled to said an input of said subtracting device and another end forming an input coupled to said an input of said adaptive filter for receiving a far-end speech signal, said hybrid circuit for transmitting speech signals from a subscriber unit to said subtracting device and for transmitting far-end speech signals to said a subscriber unit.

12. The fixed-wireless network of claim 8, wherein said residual suppression flag detector detects the absence of a near-end signal when the power level of the signal received at said an input of said residual suppression flag detector minus the power level of the signal received at said another input of said residual suppression flag detector is greater than 6 dB.

13. The fixed-wireless network of claim 12, further including, a voice activated detector for controlling said switching device, said voice activated detector receiving the signal outputted from said output of said subtracting device and the flag signal from said output of said residual suppression flag detector.

14. The fixed-wireless network of claim 13, further including, a hybrid circuit having one end forming an output coupled to said an input of said subtracting device and another end forming an input coupled to said an input of said adaptive filter for receiving a far-end speech signal, said hybrid circuit for transmitting speech signals from a subscriber unit to said subtracting device and for transmitting far-end speech signals to said a subscriber unit.

15. A method of transmitting near-end speech in a fixed-wireless network, comprising the steps of:

receiving at a near-end a far-end speech signal when a far-end speaker is talking;

generating a near-end speech signal when a near-end speaker is talking;

providing an echo replica signal of said far-end speech signal;

subtracting said near-end signal and said echo replica signal from an echo signal reflected from said far-end signal due to echo-return loss at the near-end;

updating the value of said echo replica signal to minimize any residual echo signal remaining after subtracting said echo replica signal from said echo signal;

estimating said echo-return loss (ERL) by detecting the power level of the far-end speech signal and the power level of said echo signal;

detecting a double-talk condition when the power level of said far-end speech signal is greater than the power level of said echo signal and said near-end signal minus the value of the estimated echo-return loss; and freezing the value of said echo replica signal when a double-talk condition is detected.

16. The method of transmitting near-end speech in a fixed-wireless network of claim 15, wherein the step of estimating said echo-return loss (ERL) is carried out in accordance with the relation:

$$ERL = 0.9*ERL + 0.1*(L_o/L_i)$$

wherein $L_o$ is an instantaneous signal power of a sum of the near-end speech signal and an echo signal, and wherein $L_i$ is an instantaneous signal power of the far-end speech signal.

17. The method of transmitting near-end speech in a fixed-wireless network of claim 16, wherein said double-talk condition is detected when the power level of said far-end speech signal is greater than the power level of said near-end signal and said echo signal minus the value of the estimated echo-return loss.

18. The method of transmitting near-end speech in a fixed-wireless network of claim 17, further including the steps of:

inputting said far-end speech signals to a near-end subscriber unit through a hybrid circuit;

outputting near-end speech signals from a near-end subscriber unit through said hybrid circuit.

19. A method of transmitting near-end speech in a fixed-wireless network, comprising the steps of:

receiving at a near-end a far-end speech signal when a far-end speaker is talking;

generating a near-end speech signal when a near-end speaker is talking;

providing an echo replica signal of said far-end speech signal;

subtracting said echo replica signal from an echo signal reflected from said far-end speech due to echo-residual loss at the near-end;

updating the value of said echo replica signal to minimize any residual echo signal remaining after subtracting said echo replica signal from said echo signal;

detecting the absence of near-end speech signals; and preventing the transmission of any signal in the absence of a near-end speech signal.

20. The method of transmitting near-end speech in a fixed-wireless network of claim 19, wherein said step of detecting the absence of near-end speech signals is detected when the power level of the signal coming from the near-end including any echo signal minus the power level of the signal remaining after the replica echo signal is subtracted from an echo signal is greater than 6 dB.

21. The method of transmitting near-end speech in a fixed-wireless network of claim 19, further including the steps of;

detecting whether the signal remaining after the replica echo signal is subtracted from an echo signal is background noise; and preventing the transmission of background noise in the absence of a near-end speech signal.

22. The method of transmitting near-end speech in a fixed-wireless network of claim 21, further including the steps of:

inputting said far-end speech signals to a near-end subscriber unit through a hybrid circuit;

outputting near-end speech signals from a near-end subscriber unit through said hybrid circuit.

23. A method of transmitting near-end speech in a fixed-wireless network, comprising the steps of:

receiving at a near-end a far-end speech signal when a far-end speaker is talking;

generating a near-end speech signal when a near-end speaker is talking;

providing an echo replica signal of said far-end speech signal;

subtracting said near-end signal and said echo replica signal from an echo signal reflected from said far-end signal due to echo-residual loss at the near-end;

updating the value of said echo replica signal to minimize any residual echo signal remaining after subtracting said echo replica signal from said echo signal;

estimating said echo-residual loss by detecting the power level of the far-end speech signal and the power level of said echo signal;

detecting a double-talk condition when the power level of said far-end speech signal is greater than the power level of said echo signal and said near-end signal minus the value of the estimated echo-return loss;

freezing the value of said echo replica signal when a double-talk condition is detected;

detecting the absence of near-end speech signals; and preventing the transmission of any speech signal in the absence of a near-end speech signal.

24. The method of transmitting near-end speech in a fixed-wireless network of claim 23, wherein the step of estimating said echo-residual loss (ERL) is carried out in accordance with the relation:

$$ERL = 0.9*ERL + 0.1*(L_o/L_i)$$

wherein $L_o$ is an instantaneous signal power of a sum of the near-end speech signal and an echo signal, and wherein $L_i$ is an instantaneous signal power of the far-end speech signal.

25. The method of transmitting near-end speech in a fixed-wireless network of claim 24, wherein said double-talk condition is detected when the power level of said far-end speech signal is greater than the power level of said near-end signal and said echo signal minus the value of the estimated echo-return loss.

26. The method of transmitting near-end speech in a fixed-wireless network of claim 25, further including the steps of:

inputting said far-end speech signals to a near-end subscriber unit through a hybrid circuit;

outputting near-end speech signals from a near-end subscriber unit through said hybrid circuit.

27. The method of transmitting near-end speech in a fixed-wireless network of claim 23, wherein said step of detecting the absence of near-end speech signals is detected when the power level of the signal coming from the near-end including any echo signal minus the power level of the signal remaining after the replica echo signal is subtracted from an echo signal is greater than 6 dB.

28. The method of transmitting near-end speech in a fixed-wireless network of claim 27, further including the steps of;

detecting whether the signal remaining after the replica echo signal is subtracted from an echo signal is background noise; and preventing the transmission of background noise in the absence of a near-end speech signal.

29. The method of transmitting near-end speech in a fixed-wireless network of claim 28, further including the steps of:

inputting said far-end speech signals to a near-end subscriber unit through a hybrid circuit;

outputting near-end speech signals from a near-end subscriber unit through said hybrid circuit.

* * * * *